J. C. HALDEMAN.
FEED CUTTER.
APPLICATION FILED FEB. 25, 1915.

1,155,353.

Patented Oct. 5, 1915.

Witnesses
Robert Karcher
J. H. Bishop

Inventor
James Clyde Haldeman.
By
F. W. Bond
Attorney

UNITED STATES PATENT OFFICE.

JAMES CLYDE HALDEMAN, OF SALEM, OHIO, ASSIGNOR TO THE SILVER MANUFACTURING COMPANY, OF SALEM, OHIO, A CORPORATION OF OHIO.

FEED-CUTTER.

1,155,353.  Specification of Letters Patent.  Patented Oct. 5, 1915.

Application filed February 25, 1915. Serial No. 10,487.

*To all whom it may concern:*

Be it known that I, JAMES CLYDE HALDEMAN, a citizen of the United States, residing at Salem, in the county of Columbiana and State of Ohio, have invented a new and useful Feed-Cutter, of which the following is a specification.

My invention relates to improvements in feed cutters and has more especial reference to a device of this character which is adapted to be used for cutting alfalfa or hay very fine and suitable for feed.

The object of my invention is to provide a feed cutter which will automatically cut the feed very fine and suitable for feed without any danger of choking.

Another object is to provide a cutting cylinder of greater length than the throat through which the material to be cut is fed, said cutting cylinder being open at one extremity to allow the finely cut feed to pass therefrom, said cutting cylinder being provided with a plurality of cutter bars and a rotary cutting head mounted within said cylinder and adapted to contact with said cutter bars, thus cutting the feed very fine and feeding it through the cylinder and out of the outlet at the end thereof.

Another object in providing a cutting cylinder of greater length than the throat through which the material is fed is to provide means whereby the material is fed, first, breast-wise into the cylinder and at right angles to the axis of the cutting head, and so forming the cutter head that the material will be moved or carried end-wise after entering the cylinder and in order to accomplish this purpose the cutting knives should have a continuous spiral formation throughout the entire length of the cylinder.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

Figure 1:
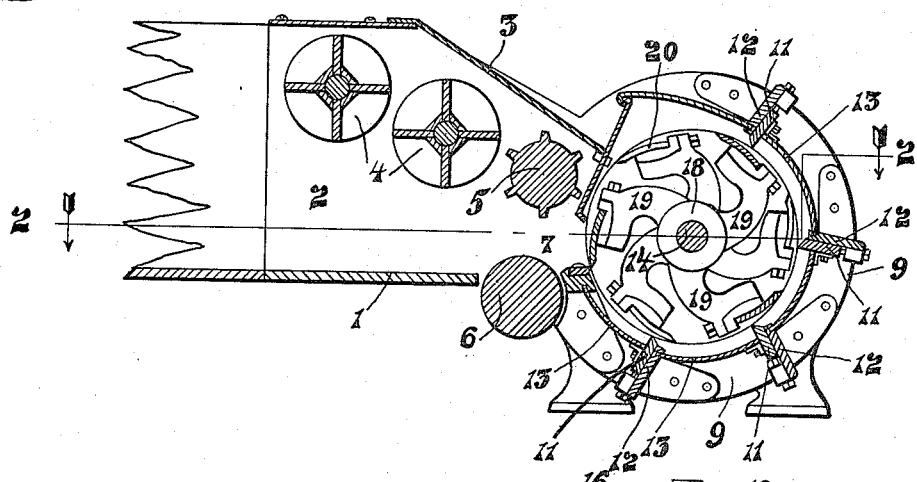
Figure 2:
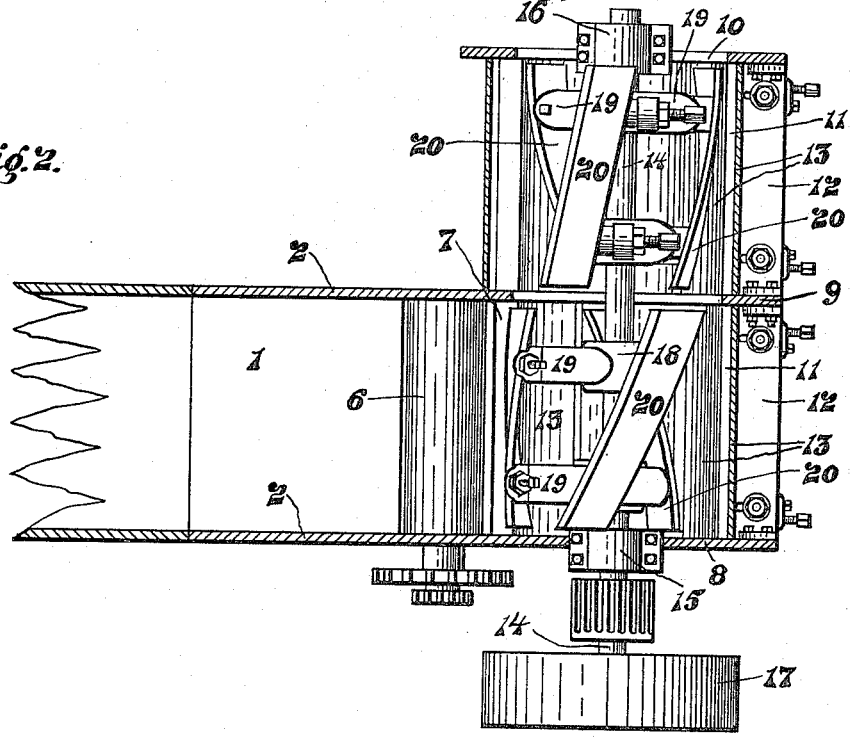

In the drawing: Figure 1 is a vertical longitudinal section through a feed cutter constructed in accordance with my invention. Fig. 2 is a section on line 2—2, of Fig. 1.

Similar numerals of reference indicate corresponding parts throughout the several views of the drawing.

In the accompanying drawings, 1 represents the bottom wall of the feed hopper, 2 the side walls and 3 the cover or top wall thereof. The usual beaters 4 and upper and lower feed rolls 5 and 6 respectively are located within the feed hopper, the feed rolls being located at the throat 7 thereof.

The cutting cylinder is located adjacent the feed hopper, preferably at right angles thereto and communicates with the throat of the feed hopper, the cutting cylinder being of greater length than the width of said throat. This cutting cylinder is preferably composed of the end castings and a central casting which support a series of curved plates and a shaft, said shaft being provided with a pair of cutting heads, although if desired a single cutting head extending substantially the entire length of the cylinder may be employed. The end frame 8 of the cutting cylinder is closed while the central frame 9 and the end frame 10 are open allowing the cut feed to pass through.

The series of cutter bars 11 are adjustably mounted upon the bars 12, said bars 12 being carried by the end frames and located at intervals between the curved plates 13, which form the side wall of the cutting cylinder.

A shaft 14 is journaled in suitable bearings 15 and 16 carried by the end frames 8 and 10 respectively, said shaft being adapted to be driven by means of a pulley 17, to which suitable power is applied, suitable gearing being provided upon said shaft for the beaters and feed rolls, but as said gearing is of the usual construction and forms no specific part of the present invention no further description thereof is thought necessary herein. A pair of cutter heads are mounted upon the shaft 14, each of said cutter heads being formed of a pair of spiders and cutting knives carried thereby, each of said spiders comprising a hub 18 and spokes 19, knives 20 being carried upon said spokes in any suitable and well known manner, said knives being adapted to coact with the cutter bars 11. If desired a single cutter head of substantially the length of the cutting cylinder may be employed instead of the two cutter heads as shown in the drawings, but it is preferable to use two cutter heads, as it is easier to manufacture the shorter knives therefor, although the same results could be obtained with a single cutter head.

The alfalfa or other material to be cut is placed in the hopper and by means of the feed rolls is fed into the cutter cylinder where it is cut very fine by means of the rotary cutter heads. As the cutting cylinder is entirely inclosed, except at the outer end, the material being cut is held within the cutter cylinder for a considerable length of time and is constantly being rotated therein and reduced to a finer state by means of the rotary cutter head and cutter bars and owing to the construction of the rotary cutter heads, the finely cut material is slowly fed toward the outlet aperture in the end plate 10 from which aperture the material is discharged. The material as it passes through the cutting cylinder is rotated with the cutting head and in order that there be no choking or clogging of the material during its cutting action or from the time it enters the cylinder until the time it is discharged therefrom it is of importance that no obstruction is offered at the delivery end of the cylinder, and for this reason the discharge outlet of the cylinder is of a diameter corresponding with the inner diameter of the cutting cylinder.

It will be understood that by forming the outlet of the opening of a size corresponding to the inner diameter of the cylinder there can be no choking or clogging action or any back pressure. I have discovered from actual use that this is of the utmost importance, owing to the fact that where a clogging or choking of the material takes place or any hindrance to the endwise movement of the material the material is liable to rotate with the cutter head within the cylinder and be carried end-wise without the proper cutting action, but by forming the discharge opening of a size corresponding with the diameter of the cutting cylinder the material is free and is thrown by centrifugal force toward the wall and in proper position for the cutting action and that during the end-wise movement of the material, regardless of its condition, reduce to what might be termed a pulverized condition without any additional beaters or crushing devices. The finished product being treated during the breast-wise movement into the cylinder and the end-wise movement through the cylinder. The knives upon the cutter head may be staggered as shown for the purpose of economy in repairs and at the same time shifting as it were the cutting points of the knives.

Although the drawings and above specifications disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. In a feed cutter, the combination of a fixed cylinder formed of substantially the same diameter from end to end, a feed hopper provided with a throat and arranged to feed breastwise to said cylinder, said throat located at the intake end of the cylinder and of a width less than the length of the cylinder, a shaft located concentric with the cylinder, a cutter head mounted on said shaft, said cutter head formed of a length to correspond substantially with the length of the cutting cylinder, and arranged to feed the material longitudinally through the cylinder, a series of cutter knives connected to the cutting cylinder, and said cutting cylinder having a free open discharge end of a size corresponding substantially with the diameter of the cutting cylinder.

2. In a feed cutter, the combination of a fixed cylinder formed of substantially the same diameter from end to end, a feed hopper provided with a throat and arranged to feed breastwise to said cylinder, said throat located at the intake end of the cylinder, a shaft located concentric with the cylinder, a cutter head mounted on said shaft, said cutter head comprising a plurality of series of knives located in staggered relation and arranged to feed the material longitudinally through the cylinder, said cutter head formed of a length to correspond substantially with the length of the cutting cylinder, a series of cutter knives adjustably connected to the cutter cylinder and said cutting cylinder having a free open discharge end of a size corresponding substantially with the diameter of the cutting cylinder.

In testimony that I claim the above, I have hereunto subscribed my name in the presence of two witnesses.

JAMES CLYDE HALDEMAN.

Witnesses:
P. B. TUCKER,
H. A. VAN SYOC.